United States Patent
Angelone (10) Patent No.: US 10,121,290 B2
(45) Date of Patent: Nov. 6, 2018

(54) SYSTEM AND METHOD FOR MANAGING POSTAL ACCOUNTING DATA USING TRANSIENT DATA COLLECTORS

(71) Applicant: Neopost Technologies, Bagneux (FR)

(72) Inventor: Sean Angelone, Austin, TX (US)

(73) Assignee: Neopost Technologies, Bagneux (FR)

( * ) Notice: Subject to any disclaimer, the term of this patent is extended or adjusted under 35 U.S.C. 154(b) by 434 days.

(21) Appl. No.: 14/927,654

(22) Filed: Oct. 30, 2015

(65) Prior Publication Data
US 2016/0049016 A1 Feb. 18, 2016

Related U.S. Application Data (62) Division of application No. 12/839,815, filed on Jul. 20, 2010, now Pat. No. 9,183,590.

(51) Int. Cl.
*G07B 17/00* (2006.01)
*G06Q 40/02* (2012.01)
*G06Q 40/00* (2012.01)

(52) U.S. Cl.
CPC ......... *G07B 17/0008* (2013.01); *G06Q 40/02* (2013.01); *G06Q 40/12* (2013.12); *G07B 2017/00145* (2013.01)

(58) Field of Classification Search
CPC .......... G06Q 10/00; G07B 17/00; G06F 21/22
USPC ........................................ 705/30, 401; 1/1
See application file for complete search history.

(56) References Cited

U.S. PATENT DOCUMENTS

| | | |
|---|---|---|
| 5,202,834 A | 4/1993 | Gilham et al. |
| 5,367,464 A | 11/1994 | Abumehdi et al. |
| 5,493,500 A | 2/1996 | Boorsma |
| 5,671,146 A | 9/1997 | Windel et al. |
| 5,699,415 A | 12/1997 | Wagner |
| 5,717,596 A | 2/1998 | Bernard et al. |
| 5,774,554 A | 6/1998 | Gilham et al. |
| 5,909,373 A | 6/1999 | Sansone et al. |
| 5,917,924 A | 6/1999 | Herbert et al. |
| 5,929,415 A | 7/1999 | Berson |
| 6,005,945 A * | 12/1999 | Whitehouse ....... G07B 17/0008 380/51 |
| 6,009,417 A | 12/1999 | Brookner et al. |
| 6,061,670 A | 5/2000 | Brand et al. |
| 6,233,565 B1 * | 5/2001 | Lewis ................... G06Q 20/00 705/26.1 |
| 6,567,794 B1 * | 5/2003 | Cordery ............... G06Q 20/02 705/401 |
| 6,587,843 B1 | 7/2003 | Gelfer et al. |
| 6,865,557 B1 * | 3/2005 | Cordery ............ G07B 17/0008 380/51 |
| 7,120,610 B1 | 10/2006 | Brookner et al. |

(Continued)

*Primary Examiner* — Oluseye Iwarere
(74) *Attorney, Agent, or Firm* — Morris & Kamlay LLP (57) ABSTRACT

Methods and systems using a single centralized database to manage postal accounting data are provided. The central database may interface with remote postal meters by way of one or more transient data collectors, which cache data from associated meters and transmit the data to the central database. The data collectors also validate postage accounts to the associated meters. The use of local transient data collectors allows for a single centralized database to be used without requiring data replication among databases local to each computer that manages postal meters.

10 Claims, 8 Drawing Sheets

(56) References Cited

U.S. PATENT DOCUMENTS

| | | | |
|---|---|---|---|
| 7,203,666 B1* | 4/2007 | Gravell | G06Q 20/108 380/51 |
| 7,433,849 B2* | 10/2008 | Cordery | G06Q 20/02 705/401 |
| 7,567,940 B1* | 7/2009 | Engelberg | G06Q 20/10 705/50 |
| 7,613,639 B1* | 11/2009 | Ogg | G06Q 20/10 705/26.1 |
| 7,752,141 B1* | 7/2010 | Ogg | G06Q 20/382 705/60 |
| 8,027,927 B2* | 9/2011 | Ogg | G06Q 20/382 705/401 |
| 8,463,716 B2* | 6/2013 | Montgomery | G07B 17/00024 705/340 |
| 2001/0042052 A1* | 11/2001 | Leon | B41J 11/42 705/401 |
| 2001/0042053 A1 | 11/2001 | Wagner et al. | |
| 2002/0087492 A1* | 7/2002 | Carroll | G07F 15/08 705/404 |
| 2002/0178354 A1* | 11/2002 | Ogg | G06Q 20/382 713/155 |
| 2003/0089765 A1 | 5/2003 | Kovlakas et al. | |
| 2003/0101143 A1* | 5/2003 | Montgomery | G07B 17/00435 705/62 |
| 2003/0120606 A1 | 6/2003 | Gravell et al. | |
| 2003/0187666 A1* | 10/2003 | Leon | G07B 17/00193 705/404 |
| 2003/0225711 A1 | 12/2003 | Paping et al. | |
| 2004/0083189 A1* | 4/2004 | Leon | G07B 17/00024 705/401 |
| 2004/0103067 A1 | 5/2004 | Mattern et al. | |
| 2005/0171922 A1 | 8/2005 | Leary et al. | |
| 2005/0278263 A1 | 12/2005 | Hollander et al. | |
| 2006/0004677 A1 | 1/2006 | Mattern et al. | |
| 2006/0136348 A1 | 6/2006 | Charroppin et al. | |
| 2007/0179910 A1 | 8/2007 | Ferraro et al. | |
| 2007/0203859 A1 | 8/2007 | Chatte et al. | |
| 2008/0010211 A1 | 1/2008 | Ferraro et al. | |
| 2009/0287602 A1 | 11/2009 | Brunsmann et al. | |
| 2010/0070765 A1* | 3/2010 | Ogg | G06Q 20/10 713/168 |
| 2010/0228674 A1* | 9/2010 | Ogg | G06Q 20/382 705/62 |
| 2011/0307703 A1* | 12/2011 | Ogg | G06Q 20/382 713/176 |
| 2012/0022980 A1* | 1/2012 | Angelone | G06Q 40/02 705/30 |
| 2012/0227094 A1* | 9/2012 | Begen | G06F 21/41 726/4 |

\* cited by examiner

SYSTEM AND METHOD FOR MANAGING POSTAL ACCOUNTING DATA USING TRANSIENT DATA COLLECTORS

BACKGROUND OF THE INVENTION

Mail metering systems often use one or more postage meters connected to a computer system such as a personal computer. Most generally, the meters frank mail pieces provided by a user by applying an indicia representing postage funds stored in a postal security device. In some systems, the postal security device may be implemented in or incorporate a local general- or special-purpose computer. During operation of the meter, data is transferred between the meter and the computer. The data typically includes account information, such as the various financial accounts or department labels into which postage amounts are allocated as they are used by the meter, and transaction amounts, such as the amount of postage applied in each transaction. Account administration, such as the specific assignment of transactions into accounts, may be performed at the attached computer or directly at the meter.

For the cases where account assignment occurs at the meter, it is important that the meter is provided access only to validated postage accounts. To accomplish this, the computer validates one or more accounts that the user is allowed to choose at the meter, and provides only validated account information to the meter. In a configuration where multiple computers are used, each computer typically maintains a separate local database of account information. Each local database may be synchronized with, and/or data replicated from, other local databases or a remote database, such as a central database that is managed by the owner or provider of the meters, or another central database. For example, multiple databases at each computer may be connected to an intranet, which allows one or more remote "administrator" computers to access, consolidate, and report upon the data that exists in the remote database or each of the individual local databases. The central database at an administrator computer also may communicate and/or synchronize with a remote data center. A system that uses multiple computers, each having a local database that stores account information for one or more postal meters, may be referred to as a distributed environment.

BRIEF SUMMARY OF THE INVENTION

Methods and systems using a single centralized database to manage postal accounting data are provided. The central database may interface with remote postal meters by way of one or more transient data collectors, which cache data from associated meters and transmit the data to the central database. The data collectors also validate postage accounts to the associated meters. The use of local transient data collectors allows for a single centralized database to be used without requiring data replication among databases local to each computer that manages postal meters.

In an embodiment, a system for managing postal account data may include a single postal account database storing authoritative account data for a plurality of postal accounts, the authoritative account data defining an available postage budget for each of the postal accounts; an application server in communication with the single postal account database; and a plurality of remote computer systems in communication with the application server, where each remote computer system may include a plurality of postal meters; a processor in communication with the plurality of postal meters; and a transient data collector to cache transaction data generated by the plurality of postal meters temporarily, where the transient data collector is configured to receive a list of one or more valid postal accounts from the application server, to validate each postal meter for use with at least one valid postal account received from the application server, and to provide the transaction data received from the postal meter to the application server; and where the application server is configured to receive cached transaction data from the transient data collector and to update the single postal account database based upon the received transaction data.

In an embodiment, a method for managing postal account data may include executing a transient data collector on a local computer in communication with a postal meter; retrieving, by the transient data collector, a list of one or more valid accounts and associated postage budgets from a remote application server, the remote application server storing authoritative account data for a plurality of postal accounts; receiving, by the transient data collector, a plurality of franking transactions performed by the postal meter; caching the plurality of franking transactions at the transient data collector; sending the plurality of franking transactions to the remote application server; removing the cached plurality of franking transactions from the transient data collector's cache subsequent to sending the plurality of franking transactions to the remote application server; and receiving, by the transient data collector, an updated postage budget for each valid account associated with one of the plurality of franking transactions sent to the remote application server, the updated postage budget reflecting a change due to at least one of the plurality of franking transactions. The step of sending the plurality of franking transactions to the remote application server may include sending a first batch of franking transactions to the remote application server via a first transaction thread, and the method may further include, in response to completion of processing a second batch of franking transactions while the first transaction thread is active, initiating a second transaction thread, and sending the second batch of franking transactions to the remote application server via the second transaction thread. The steps of sending the first batch of franking transactions and sending the second batch of franking transactions may be performed concurrently. The first transaction thread may correspond to a first postal meter of the plurality of postal meters, and the second transaction thread may correspond to a second postal meter of the plurality of postal meters. In some embodiments, the method may further include receiving a request to verify that a postage account is valid from the postal meter; and providing, from the transient data collector to the postal meter, an indication that the postage account is valid. In some embodiments, the indication that the postage account is valid is provided to the postal meter within about 10 ms, and/or not more than about 30 ms, of receiving the request.

In an embodiment, a method of communicating between a postal meter and a remote application server, may include removing stored data from a transient data collector cache, the cache being stored in a computer-readable medium in a computer system in communication with a postal meter and a remote application server; validating an account in use at the postal meter with the remote application server; requesting a current postage balance for the account from the application server; receiving a budget amount for the account from the application server; opening a persistent connection to the application server from the transient data collector; receiving transaction data at the transient data collector from the postal meter; and providing the transaction data to the application server from the transient data collector. The method may further include receiving a response indicating that the account is valid from the remote application server within about 10 ms of requesting confirmation that the account is valid, and/or receiving a response indicating that the account is valid from the remote application server within not more than about 30 ms of requesting confirmation that the account is valid. The remote application server may store authoritative postage balance information for the account. A confirmation may be received from the remote application server that a current postage balance for the account is successfully updated based upon the transaction data provided to the remote application server. The confirmation may be received over the persistent connection.

DETAILED DESCRIPTION OF THE INVENTION

It has been found that collection of postage meter transaction data via accounting software running on local computers often requires significant undesirable data transfer overhead. For example, in some distributed environment configurations, the local databases may be synchronized and replicated in real time over an intranet, resulting in significant processing and communication overhead. Further, data authority in postal accounting systems is critical, and distributed environment configurations may result in a loss of data integrity: if an intranet fails or experiences significant latency while meters are processing postage transactions, the data stored on each local database may become desynchronized. This and other similar issues inherent in distributed systems may lead to potentially significant accounting errors.

Figure 1:
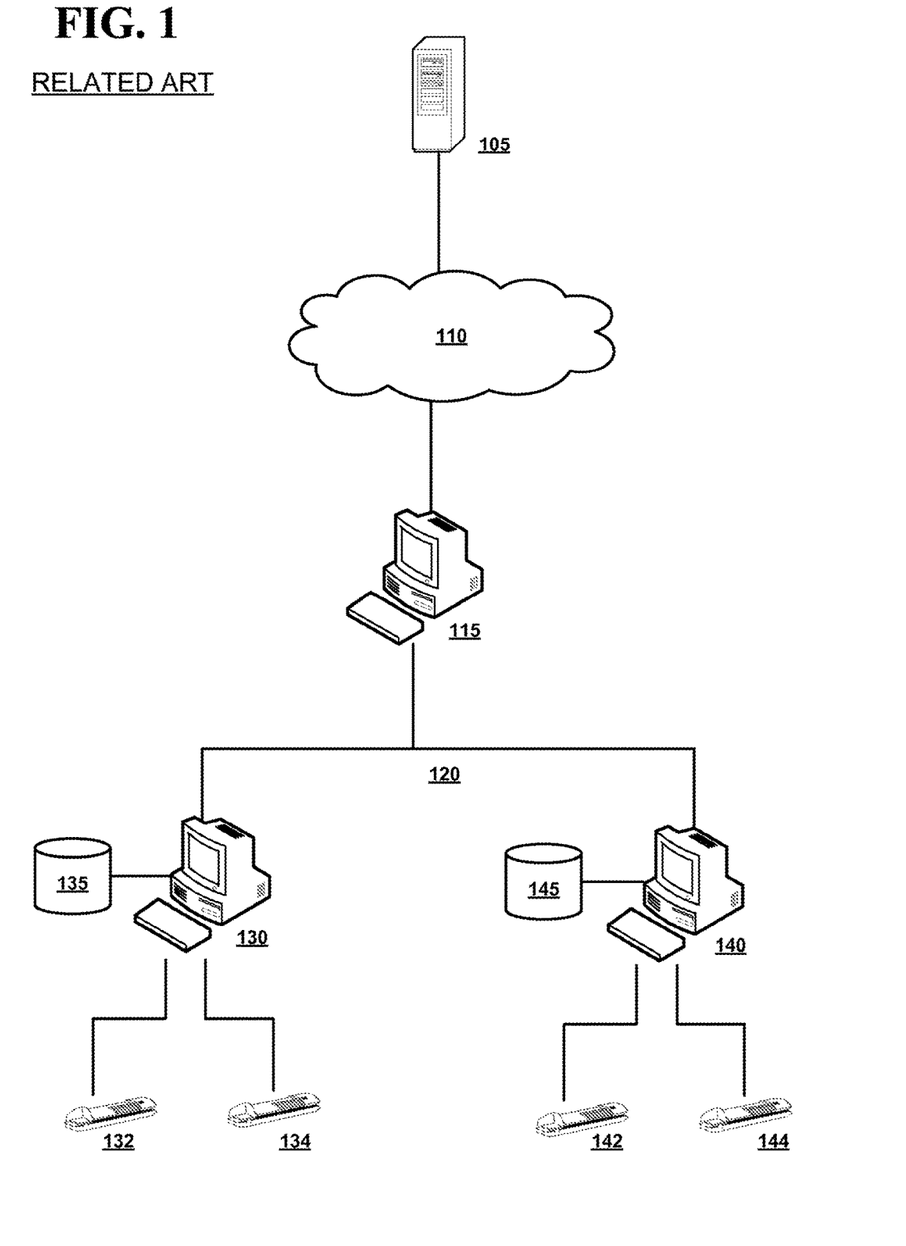
FIG. 1 shows a related system configured to use a distributed environment to manage postage transactions.

An example system using a distributed environment to manage postage transactions shown in FIG. 1. One or more local computers 130, 140 may be in communication with and manage one or more postage meters 132, 134, 142, 144. Each local computer 130, 140 may have a local database 135, 145, respectively, that stores account information for the meters managed by the computer. The computers and meters may be connected via a local network 120, such as an intranet. An administration computer 115 may aggregate account information from the local computers 130, 140. The administration computer 115 also may send and receive aggregate account information over a large-area network 110, such as the Internet, to, for example, a remote data center 105.

In embodiments of the present invention, the local database(s) may be replaced by a single centralized database, such as at a remote data center, thereby reducing the overhead and configuration required at each local computer. Prior to the present invention, distributed environments were not suitable for such centralization due to the need for immediate access by the meter to current and validated account information. For example, merely replacing multiple local databases in a distributed environment with a single central database would not provide sufficiently immediate data, due to the lag and latency inherent in any distributed network communications. This effect would be especially pronounced if the centralized database was located at a remote data center, as is attainable using embodiments of the present invention.

As a specific example, latencies over the Internet typically are on the order of 30-100 ms or more. When processing mail through a meter, only a few milliseconds are typically available for the franking process, so the meter needs relatively immediate access to data that indicates whether a particular account designated for use with a franking transaction is valid. Other features also may be particularly sensitive to latency, such as budget monitoring and weight validation relative to maximum weights allowed for mail classes and/or accounting categories. It is believed that if meters in a distributed configuration were required to communicate directly with a remote data center to synchronize separate local databases, the resulting latency would render the system unusable.

In embodiments of the invention, a transient data collector is used at each local computer to communicate with the meters managed by the local computer and convey data to and from a centralized database that may be located at a remote data center. For example, the transient data collector may communicate with an application server at the data center via an exposed API.

The transient data collector may be implemented as a small software or hardware module, or a combination of hardware and software at the local computer. A transient data collector may include relatively little internal logic. For example, the transient data collector may merely cache data received from one or more meters, and provide the cached data to a central data center. Similarly, the transient data collector may receive account information from the remote data center, and provide it to local meters with little or no latency, at a speed sufficient to allow the meters to accurately and timely perform franking transactions.

Figure 2:
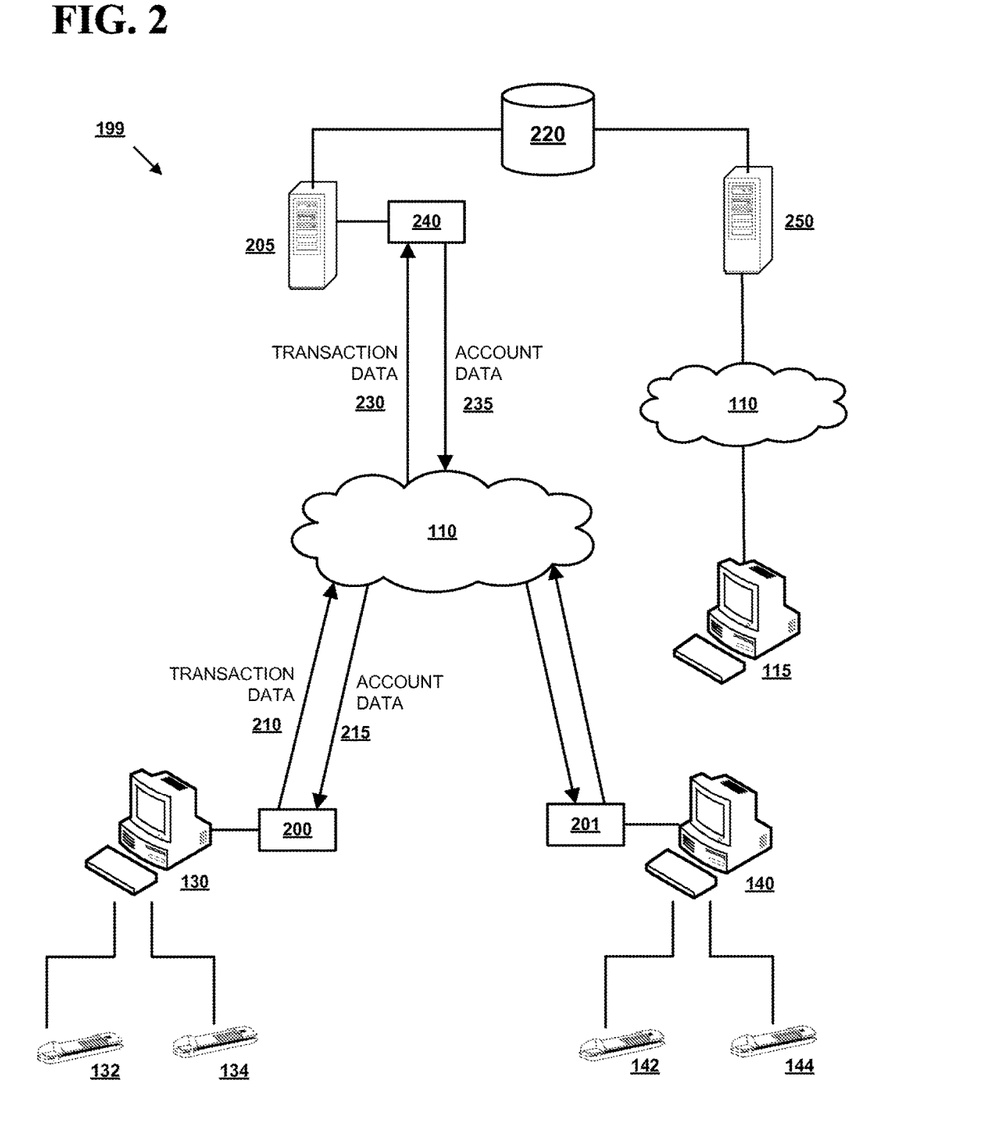
FIG. 2 shows an example system for managing postage transactions according to an embodiment of the invention.

FIG. 2 shows an example system 199 for managing postage transactions according to an embodiment of the invention. The system 199 may include a postal account database 220 that is configured to store account data for multiple postal accounts. The account data may include, for example, postage balances for various accounts that are available for use by one or more meters located remotely from the database 220. The system 199 also may include an application server 205 in communication with the database 220. The application server 205 may provide an application programming interface (API) 240 or other interface for use by transient data collectors 200, 201, installed at the local computers 130, 140.

In operation, transient data collectors 200, 201 may cache postal, or transaction data generated by postal meters 132, 134 and 142, 144, respectively, managed by the computers 130, 140 at which the transient data collectors 200, 201 are installed. For example, transient data collectors 200, 201 may provide transaction data 210, 230 to the API 240 via a network 110 such as an intranet or the Internet. In an embodiment, when franking transactions are performed at a meter, the transactions are allocated into validated accounts as indicated at the meter, and transferred from the meter to a transient data collector. For each transaction, the transaction data may be transferred in a separate thread between the collector and the application server. Depending upon the meter's processing speed, the number of mailing machines in operation between the corresponding PC and the collector, and network transmission/latency time, multiple transaction threads may be opened between the collector and the application server as needed.

The postal data cached at the transient data collectors 200, 201 preferably is stored only temporarily, and typically is quickly transferred to the application server 205 so that the single database 220 may be kept up to date. For example, the transient data collectors 200, 201 may typically store the data for not more than 100 ms before the data has been transferred to the application server 205. Typically, the data is then deleted from the transient data collector 200, 201 and/or overwritten with new data received from one or more meters 132, 143, 142, 144.

Upon receiving cached postal data, such as transaction data 210, 230 from a transient data collector 200, 201, the application server 205 may update the database 220. For example, account data in the database 220 may be updated to reflect postage used by the meters 132, 134, 142, 144. The account data stored in the database 220 may be referred to as "authoritative" because it represents the true, accurate postage account balance or budget for the accounts stored in the database 220 when it is up to date, i.e., when there are no outstanding franking transactions that have not been reconciled with the database 220. In contrast, transient data collectors 200, 201 may store temporary or transient account data, that is subject to change as meters 132, 134, 142, 144 in communication with the transient data collectors 200, 201 perform franking transactions.

A transient data collector 200, 201 also may provide information about valid accounts to an associated meter 132, 134, 142, 144. In an embodiment, an application server 205 may provide account data 215, 235, such as a list of valid postal accounts from which the associated meters 132, 134, 142, 144 may draw postage funds, to a transient data collector 200, 201 for use by one or more associated meters 132, 134, 142, 144. The account data 215, 235 may be provided via an API 240. Each collector 200, 201 may cache this information for the purpose of quickly answering requests from individual meters 132, 134, 142, 144 to validate accounts and check remaining budget amounts. For example, prior to or during a franking transaction, a meter 132, 134, 142, 144 may request validation of an account that is indicated for use in applying postage to a mail piece. The transient data collector 200, 201 may validate or refuse an account for use based upon account data 215, 235 received from the application server 205. The validation may be provided relatively quickly, typically within less than about 30 ms of when validation is requested by the meter 132, 134, 142, 144, and preferably not more than about 10 ms. This response time is much lower than would be expected from a configuration in which a meter is configured to communicate directly with the central database 220 to verify account data 215, 235 for each account.

In an embodiment, local storage may provide recovery in the event of a network service interruption, such as a disruption to the network 110. For example, the transactions may be stored in a first-in, first-out spool, such as a disk queue, at the local computer 130, 140. Further, each stored transaction conducted by a meter 132, 134, 142, 144 may be unique, and may be identified by data such as a meter serial number, a time/date stamp, a customer identification, a unique identifier generated from a combination of one or more of these items, or another unique identifier. The unique identifiers can be used to prevent duplication of transaction processing in the event of a service interruption. For example, during a restoration process the system may track unique identifiers of transactions that have been restored to the system and, if a duplicate is identified, the second occurrence may not be processed. Such a unique identifier may be referred to as a "unique reliability identifier" herein because these transactions may therefore be 'trusted' by, and integrated into, the database 220 upon restoration of network 110 services. Accordingly, during normal operation of the network 110, transient data stored by a data collector 200, 201 may be routinely deleted or overwritten by new transaction data during operation of a meter 132, 134, 142, 144 in communication with the collector 200, 201. Furthermore, in response to a network 110 service interruption that prevents real-time account validation, a meter 132, 134, 142, 144 may include an offline mode to collect transactions in an "unspecified" account that may be subsequently reconciled after restoration of network service. In some embodiments, operation of a meter 132, 143, 142, 144 may be blocked in response to a network service interruption that prevents the ability to validate accounts.

In an embodiment, a transient data collector 200, 201 may use a "long-polling" technique when communicating with an application server. To do so, the collector 200, 201 may open a single, persistent connection to the application server 205. That is, the connection is not closed between sequential transmissions to or from the collector 200, 201, but rather is maintained in an open or active state. The persistent connection may be used to transfer the valid account data 215, 235 to the data collector 200, 201 and the transaction data 210, 230 to the application server 205 as previously described. Additional connections, also referred to as "transaction threads" which may or may not also be persistent, may be opened if additional transaction data 210, 230 becomes available while the collector is transmitting or receiving data using the initial persistent connection or previously initiated, presently active transaction threads.

In an embodiment, the data collector 200, 201 may receive from the application server 205, and/or provide to a meter 132, 134, 142, 144, a list of valid accounts for the meter 132, 134, 142, 144. The meter 132, 134, 142, 144 or a user at the meter 132, 134, 142, 144, may then be presented with a list of valid accounts from which to choose for each franking transaction or series of franking transactions.

In an embodiment, the administrator computer 115 may access the database 220 via a web server 250. Thus, the administrator computer 115 need not be on the same intranet or other network as the meters 132, 134, 142, 144 and associated computers 115, 130 and data collectors 200, 201, though in some embodiments the administrator computer 115 may access or be on an intranet or other network with the meters 132, 134, 142, 144. The central database 220 thus may be accessed, manipulated, and/or reported upon by any Internet-connected computer via the web server 250.

Figure 3:
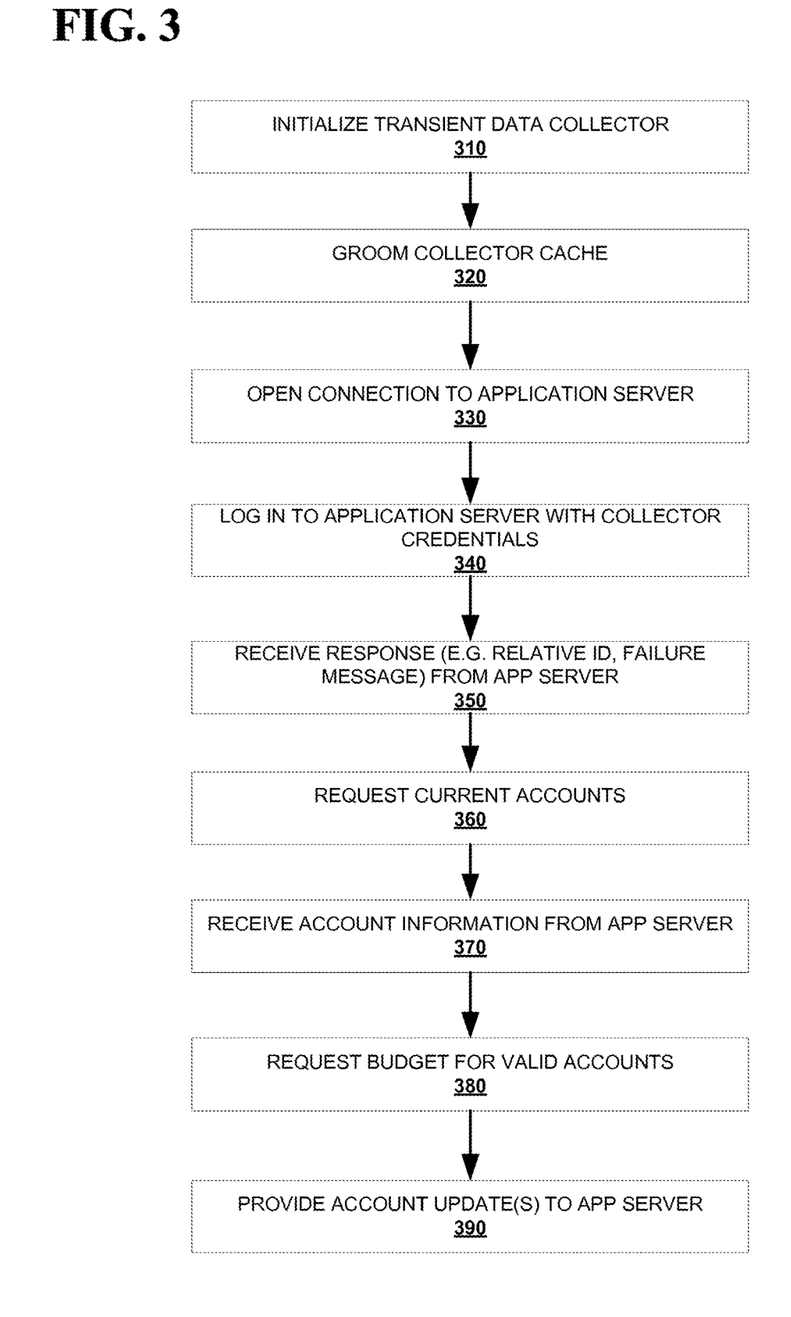
FIG. 3 shows an example of a process performed by a transient data collector.

FIG. 3 (with reference to FIG. 2) shows an example of a process performed by a transient data collector 200, 201. A collector 200, 201 may initialize itself 310 and perform a self diagnosis. The collector 200, 201 may "groom" a local cache 320 by deleting any account data, transaction data, or other data stored in the cache. The collector 200, 201 then may establish a connection to each associated meter 132, 134, 142, 144. The collector 200, 201 may identify the meters 132, 134, 142, 144 for which it is responsible via a configuration file with a list of meters that may be stored in the collector 200, 201 and/or the associated computer 130, 140. The collector 200, 201 may present an interface to the local computer 130, 140 via any suitable interface, such as in a standard Windows service or other interface.

The data collector 200, 201 may then communicate with the application server 205 at 330, for example via an HTTP GET request, to log in with the collector's credentials, such as a username, password, and/or unique identifier at 340. The application server 205 may return a relative ID or a failure message to the collector at 350. The collector 200, 201 may send a request at 360 for current accounts for its location or enterprise identifier or username. However, accounts also could be identified to the specific computer 130, 140, meter 132, 134, 142, 144, or collector 200, 201, in which case the collector 200, 201 may send a unique machine number or other appropriate identifier. At 370, the application server 205 may send a list of account data 215, 235, such as account name, identifier number, active status, etc. At 380, the collector 200, 201 may send a request for a budget for each valid account used by an associated meter 132, 134, 142, 144. The application server 205 may return, for example, a time range over which the budgets are valid, budget amounts or an indication that the budget is unlimited if the account is configured for tracking over a time period, or other information. The collector 200, 201 may then open a long poll connection or other connection at 390 as previously described, to receive account changes or activity from the administrator computer 115 via the application server 205, as well as to provide account changes or activity to the central database 220.

Figure 4:
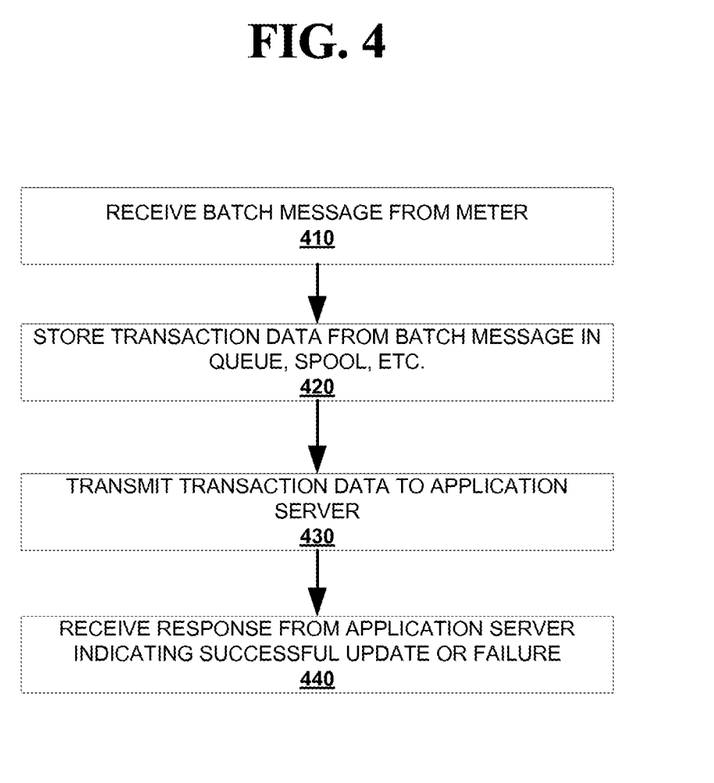
FIG. 4 shows an example of a transaction performed by a meter, a transient data collector, and a central database.

FIG. 4 (with reference to FIG. 2) shows an example of a process to transfer data relating to a transaction performed by a meter 132, 134, 142, 144, via a transient data collector 200, 201 to a central database 220. At 410, a meter 132, 134, 142, 144 may send a batch message to a collector 200, 201 via computer 130, 140. For example, the message may indicate the number of mail pieces processed, the mail class, average weight, cost, etc. for a particular account. At 420, the collector 200, 201 or computer 130, 140 may store this information in a persistent queue, spool, or other semi-temporary data storage mechanism to prevent loss, such as in a power failure or other system failure. The transfer of transaction data 210, 230 between the meter 132, 134, 142, 144 and the central database 220 via the transient data collector 200, 201 may be processed on a transaction thread independent from the long-polling update requests. At 430, the data collector 200, 201 may transmit data to the application server 205, typically via an HTTP POST or similar technique. As previously described, access to and communication with the application server 205 may be via the API 240 or other common interface. The data transmission may include raw or lightly-processed transaction data 210, 230 that has been cached by the collector 200, 201. At 440, the application server 205 may return a response indicating whether the central database 220 has been successfully updated based on the transaction data 210, 230 sent by the collector 200, 201. In an embodiment, the collector 200, 201 may send batches of transaction data to the application server 205. If a prior persistent connection or transaction thread opened by the collector is still transmitting, the collector 200, 201 may open a new connection (transaction thread) so as to quickly empty the collector's 200, 201 cache. The ability to initiate new connections may be useful, for example to decrease or minimize the time during which outstanding transaction data has not been reconciled in the central database 220.

Notably, transient data collectors 200, 201 according to embodiments of the invention need not store state information from associated meters 132, 134, 142, 144. Rather, the transient data collector 200, 201 merely caches and/or passes information to the central database 220 that is a single consolidation and collection point. Other configurations, such as where data is consolidated and synchronized upon a poll request from a central server, generally would lead to undesirable excessive communication overhead and a need for additional device configuration.

In an embodiment, the system 199 may include specialized techniques to implement conventional postal accounting functionality, such as account addition, modification, deletion, etc. For example, the application server 205 may send a message with new account information to the transient data collector 200, 201. The collector 200, 201 may then save new account information in a cache or other storage mechanism. Similar operations may be performed to remove an account, change a user name or other access data, update a budget period or amount, etc.

Figure 5:
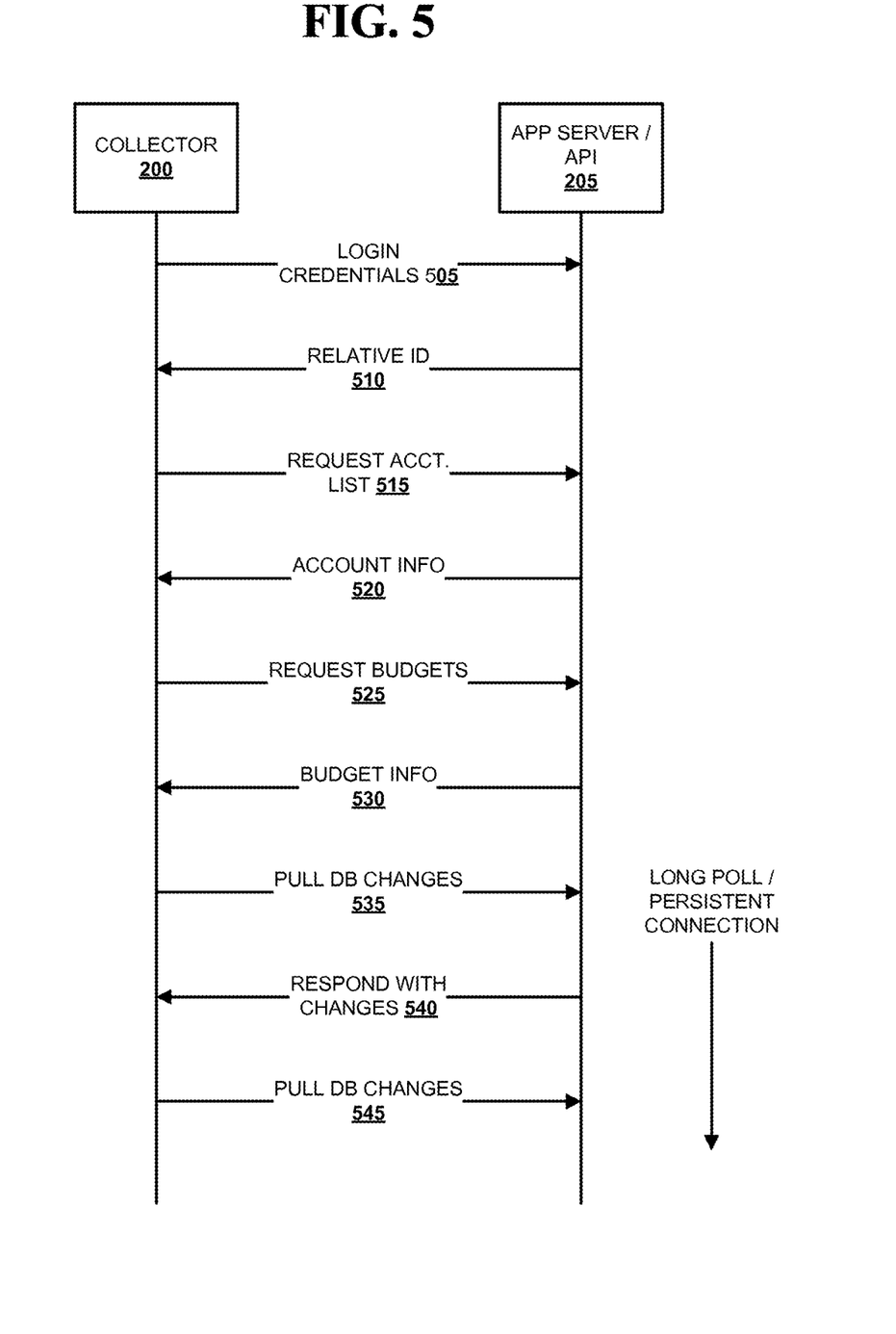
FIG. 5 shows a detailed example of a communication exchange between a transient data collector and an application server.

FIG. 5 shows a detailed example of a communication exchange between a transient data collector, such as the data collectors 200, 201 of FIG. 2, and an application server, such as the application server 205 of FIG. 2. At 505, the collector 200, 201 may send login credentials, such as a user name and password, to the application server 205. The application server 205 may then return an identifier for the collector 200, 201 at 510, which may be used to identify the collector 200, 201 in subsequent transactions. At 515, the collector 200, 201 may request a list of valid accounts for one or more meters associated with the collector 200, 201. The request may include, for example, an enterprise name and/or the identifier sent at step 510.

At 520, the application server may return account data 215, 235, such as account names, identifications, and statuses, to the collector 200, 201. The collector 200, 201 may request a budget for each relevant account at 525, and receive budget information from the application server 205 at 530. The budget information may include, for example, the amount and time range over which the account name or identification is valid.

At 535, the collector 200, 201 may initiate a "long poll," i.e., a persistent connection, with the application server 205, to allow for exchange of account data. The application server 205 also may provide budget changes, updated account information, or other data at 540, using the same persistent connection. At 545, the collector 200 may again provide data to the application server 205 over the persistent connection using a request similar to the request used at 535.

Figure 6:
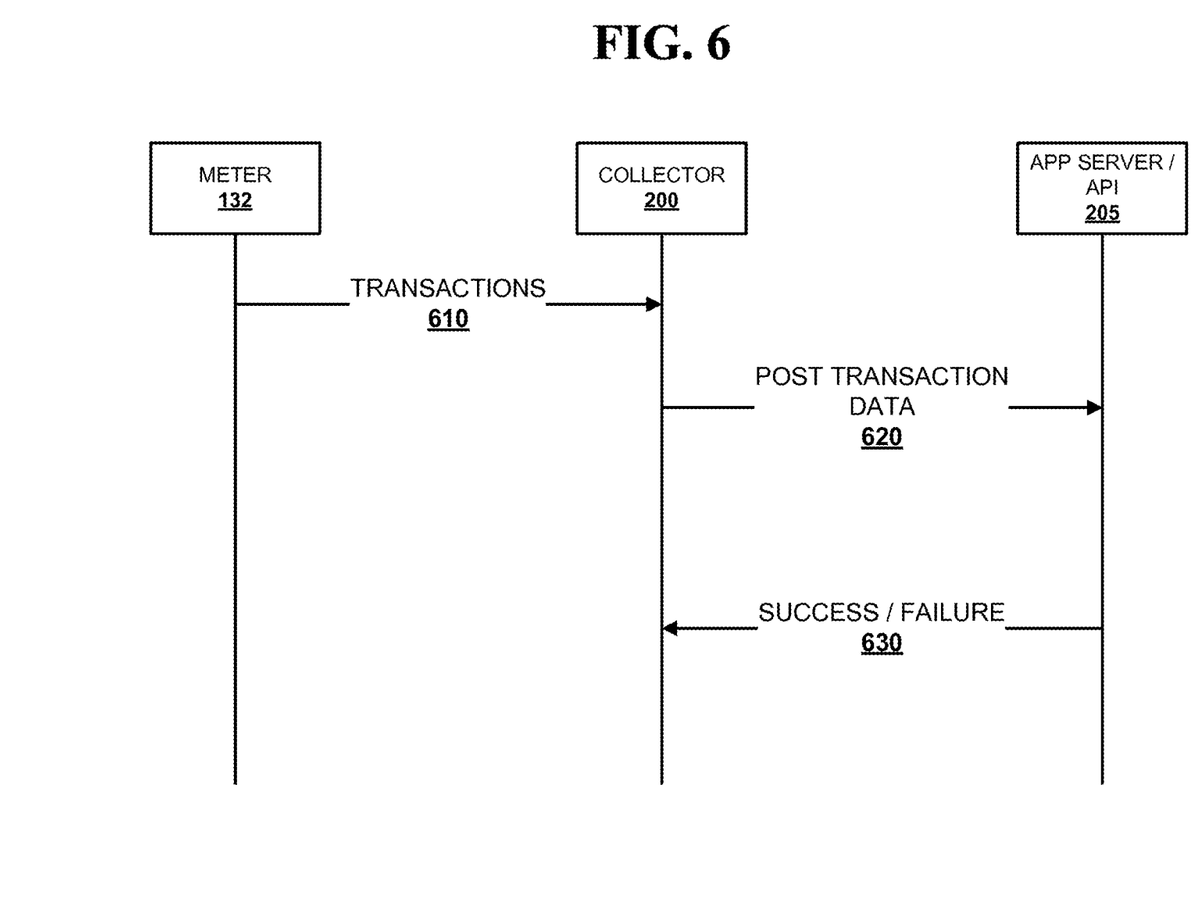
FIG. 6 shows an example process for performing a franking operation.

MG. 6 shows an example communication exchange transferring transaction data 210, 230 resulting from a franking operation to the central database 220 via an application server 205. The illustrated exchange may be performed, for example, as a separate communication from that shown by FIG. 5. At 610, a meter 132, 134, 142, 144 may provide transaction data to a collector 200, 201. The transaction data 210, 230 may include, for example, the number of pieces, class, weight, sending department or other cost enter, total cost, etc. At 620, the collector 200, 201 may send the transaction data 210, 230 to the application server 205. The transaction data 210, 230 may be sent as it is received or it may be sent in batches, depending on the particular configuration and the available resources. If processing of a subsequent batch of mail is completed while transaction data 210, 230 for a previously completed batch is being transmitted, such as via a previously initiated transaction thread, an additional transaction thread may be initiated to transfer the transaction data 210, 230 relating to the subsequent batch. In this manner, both transaction threads may be concurrently active and transferring data. It will be appreciated that multiple transaction threads may be concurrently active, with one or more of the multiple transaction threads corresponding to one or more of the multiple meters associated with a given collector, such as meters 132, 134 associated with collector 200, for example. At 630, the application server 205 may attempt to update the central database 220, and may send a success or failure message as appropriate to the collector 200, 201. In some embodiments, the transaction data 210, 230 may be preserved and resent by the collector 200, 201 until the success message is received from the application server 205, thereby indicating successful transmission of the transaction data 210, 230. That is, the collector 200, 201 may be responsive to the success message to delete the transaction data 210, 230 from its cache.

Figure 7:
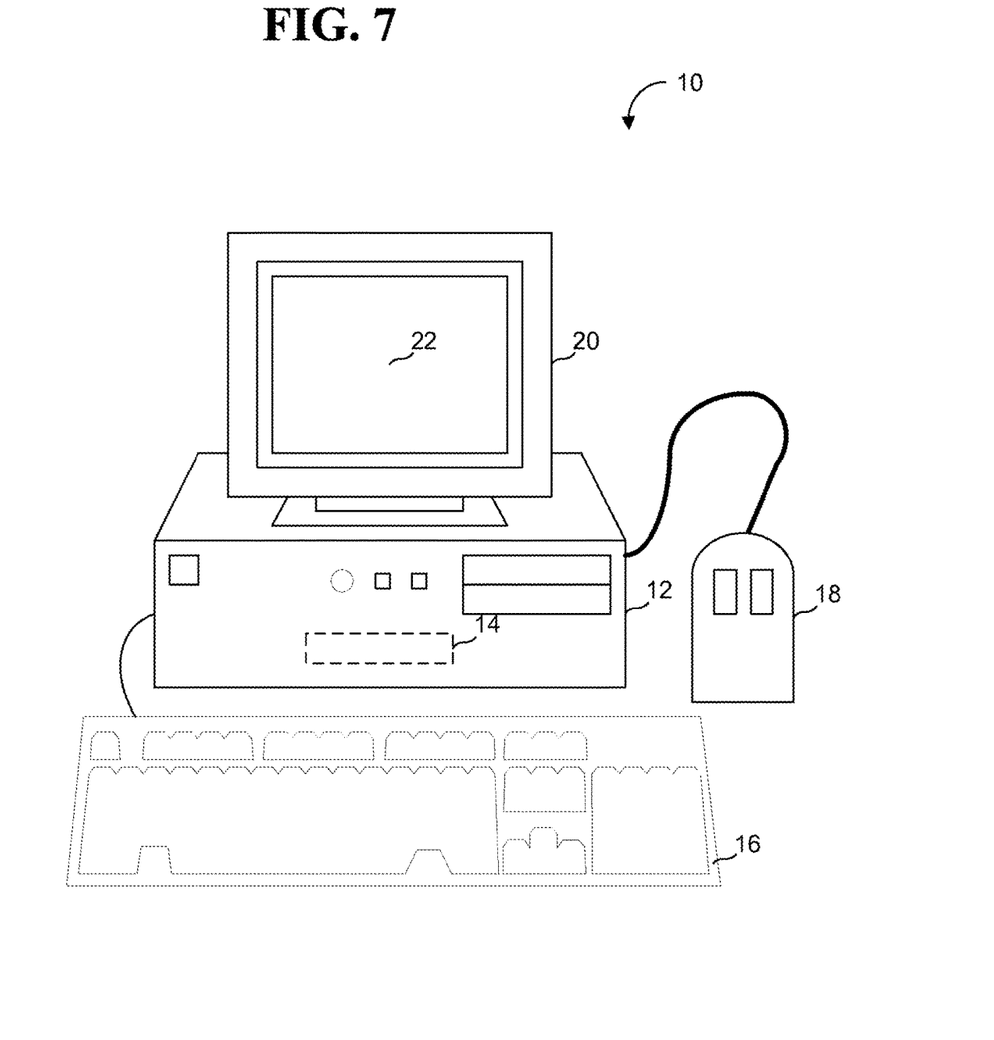
FIG. 7 shows a computer suitable for use with embodiments of the present invention.

FIG. 7 shows a computer suitable for use with embodiments of the present invention. The computer 10 may include a processing unit 12, which may include one or more computer readable storage media 14. The computer may interface with a human operator via an output 20, which may include a visual display 22 to display text, graphics, video, and other visual data. The computer may receive input via a mouse 18, keyboard 16, and/or any other suitable user interface. The general operation of the computer 10 will be understood to one of skill in the art.

Figure 8:
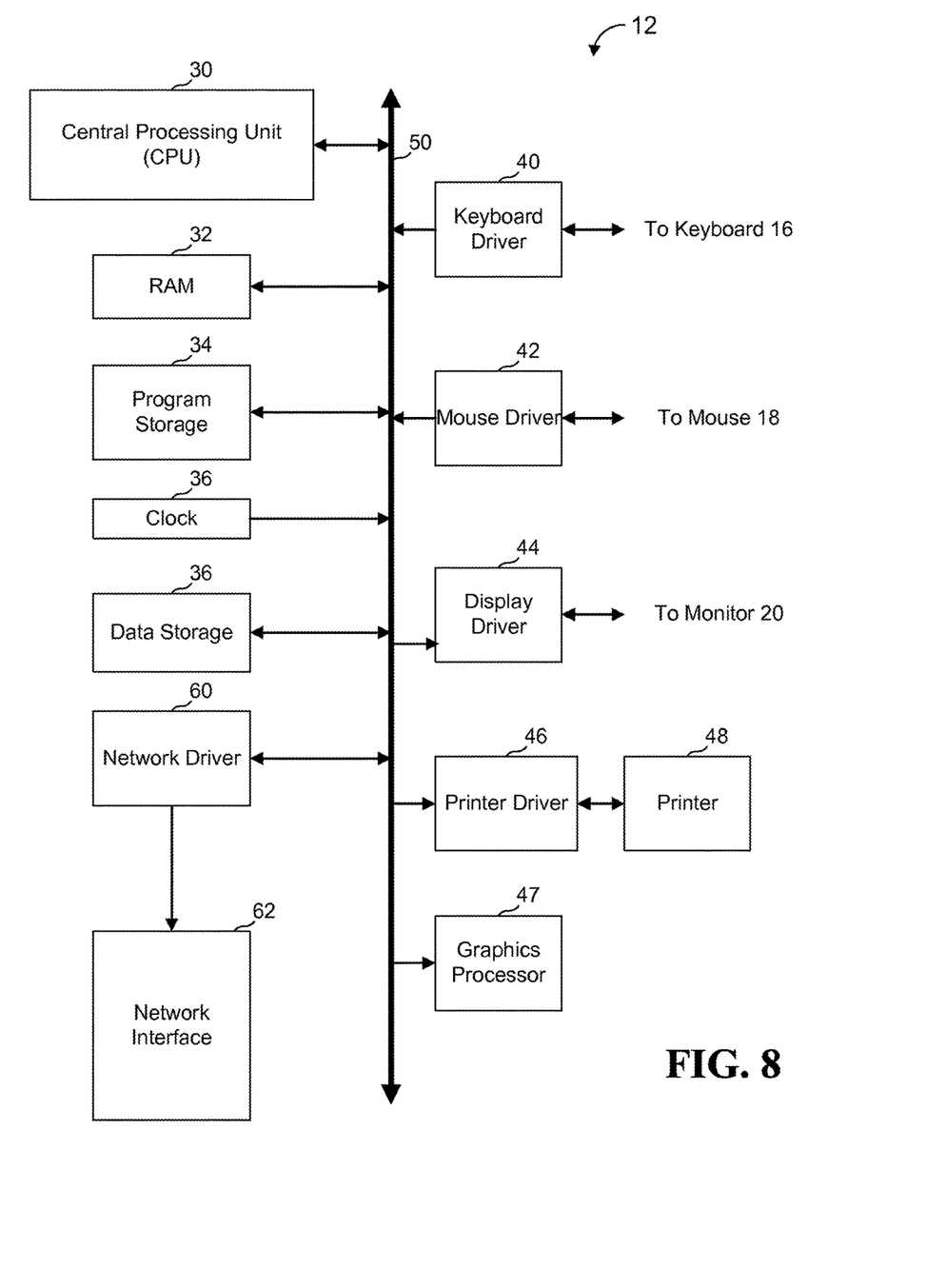
FIG. 8 shows a schematic diagram of the processing unit shown in FIG. 7.

FIG. 8 shows a schematic diagram of the processing unit 12. A central processing unit 30 may communicate with various other components via a main bus 50 and other suitable communication lines (not shown). Data may be stored in volatile memory such as RAM 32, program storage 34 and/or data storage 36. The program storage 34 and/or data storage 36 may include various types of computer-readable media, such as CD-ROMs or other type of optical disks, floppy diskettes, ROMs, RAMs, EPROMs, EEPROMs, magnetic or optical cards and drives, flash memory, or other types of machine-readable mediums suitable for storing electronic instructions. Computer-readable instructions may be stored in the program storage 34. When executed by the computer, these instructions may cause the computer to implement specific methods as described herein, and may cause the computer to operate in accordance with those methods. In an embodiment, execution of the instructions stored in the program storage 34 may transform a general-purpose computer into a computer configured to perform one or more methods embodied by the instructions. A clock 35 may be used to synchronize operation of the other elements of processing unit 12. A network driver 60 may manage connections between a network interface 62, such as a TCP/IP or other suitable interface, to allow the computer to communicate with other computers, operators, or other entities. A keyboard driver 40 may communicate with the keyboard 16 to receive input from an operator. A mouse driver 42 may manage communication with the mouse 18 to coordinate reception of input signals. A display driver 44 may manage communications between the processing unit 12 and the monitor 20, such as to display appropriate output on the monitor 20. Similarly, a printer driver 46 may manage communications with a printer 48. A graphics processor 46 may generate and manage manipulation and display of graphical elements such as 2D images, 3D images and objects, and other visual elements. The general operation of the various components shown in FIG. 5 otherwise will be understood by one of skill in the art.

An embodiment of the invention may be embodied in the form of computer-implemented processes and apparatuses for practicing those processes. Embodiments also may be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Examples provided herein are merely illustrative and are not meant to be an exhaustive list of all possible embodiments, applications, or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the relevant arts or fields are intended to be within the scope of the appended claims.

The disclosures of all references and publications cited above are expressly incorporated by reference in their entireties to the same extent as if each were incorporated by reference individually.

What is claimed is:

1. A method of communicating between a postal meter and a remote application server, comprising:
   removing stored data from a transient data collector cache, the cache being stored in a computer-readable medium in a computer system in communication with a postal meter and a remote application server;
   validating an account in use at the postal meter with the remote application server;
   requesting a current postage balance for the account from the application server;
   receiving a budget amount for the account from the application server;
   opening a persistent connection to the application server from the transient data collector;
   receiving transaction data at the transient data collector from the postal meter; and
   providing the transaction data to the application server from the transient data collector.

2. The method of claim 1, wherein the step of removing is responsive to receiving, by the transient data collector, a message indicating successful receipt of the plurality of franking transactions at the remote application server.

3. The method of claim 1, wherein the step of providing the transaction data to the application server comprises sending a first batch of franking transactions to the remote application server via a first transaction thread, the method further comprising:
   in response to completion of processing a second batch of franking transactions while the first transaction thread is active, initiating a second transaction thread; and
   sending the second batch of franking transactions to the remote application server via the second transaction thread.

4. The method of claim 1, wherein the steps of sending the first batch of franking transactions and the sending the second batch of franking transactions are performed concurrently.

5. The method of claim 1, wherein the first transaction thread corresponds to a first postal meter and the second transaction thread corresponds to a second postal meter.

6. The method of claim 1, further comprising receiving a response indicating that the account is valid from the remote application server within about 10 ms of requesting confirmation that the account is valid.

7. The method of claim 1, further comprising receiving a response indicating that the account is valid from the remote application server within not more than about 30 ms of requesting confirmation that the account is valid.

8. The method of claim 1, wherein the remote application server stores authoritative postage balance information for the account.

9. The method of claim 1, further comprising the step of receiving confirmation from the remote application server that a current postage balance for the account is successfully updated based upon the transaction data provided to the remote application server.

10. The method of claim 1, wherein the confirmation is received over the persistent connection.

* * * * *